(12) United States Patent
Dandekar et al.

(10) Patent No.: US 10,358,389 B2
(45) Date of Patent: Jul. 23, 2019

(54) SILICONE COMPOSITION, SUBSTRATE COATED WITH THE SILICONE COMPOSITION AND A PROCESS THEREFOR

(71) Applicant: Dow Corning Corporation, Midland, MI (US)

(72) Inventors: Deepak Vijay Dandekar, Mumbai (IN); Ganesh Daund, Maharashtra (IN); Vivek Prabhakar Raje, Maharashtra (IN); Milind Vaidya, Thane (IN)

(73) Assignee: DOW SILICONES CORPORATION, Midland, MI (US)

( * ) Notice: Subject to any disclaimer, the term of this patent is extended or adjusted under 35 U.S.C. 154(b) by 84 days.

(21) Appl. No.: 15/513,680

(22) PCT Filed: Sep. 24, 2015

(86) PCT No.: PCT/IN2015/000370
§ 371 (c)(1),
(2) Date: Mar. 23, 2017

(87) PCT Pub. No.: WO2016/046839
PCT Pub. Date: Mar. 31, 2016

(65) Prior Publication Data
US 2017/0233299 A1    Aug. 17, 2017

(30) Foreign Application Priority Data
Sep. 26, 2014   (IN) .......................... 3090/MUM/2014

(51) Int. Cl.
| | |
|---|---|
| C04B 41/48 | (2006.01) |
| C04B 28/02 | (2006.01) |
| C04B 20/10 | (2006.01) |
| C09D 183/04 | (2006.01) |
| C08L 83/04 | (2006.01) |
| C09D 183/08 | (2006.01) |
| C04B 103/65 | (2006.01) |
| C04B 111/00 | (2006.01) |
| C08G 77/16 | (2006.01) |

(52) U.S. Cl.
CPC ........ *C04B 41/488* (2013.01); *C04B 20/1051* (2013.01); *C04B 28/02* (2013.01); *C08L 83/04* (2013.01); *C09D 183/04* (2013.01); *C09D 183/08* (2013.01); *C04B 2103/65* (2013.01); *C04B 2111/00508* (2013.01); *C08G 77/16* (2013.01); *Y02W 30/94* (2015.05); *Y02W 30/95* (2015.05)

(58) Field of Classification Search
CPC ..... C04B 20/1051; C04B 28/02; C04B 14/06; C04B 18/141; C04B 18/167; C04B 2103/10; C04B 2103/30; C04B 2103/304; C04B 24/42; C04B 40/0608; C04B 7/02; C04B 2103/65; C04B 2111/00508; C04B 41/488; C08G 77/16; C08L 83/04; C09D 183/04; C09D 183/08; Y02W 30/94; Y02W 30/95
See application file for complete search history.

(56) References Cited

U.S. PATENT DOCUMENTS

| | | | |
|---|---|---|---|
| 5,844,060 | A | 12/1998 | Furuya et al. |
| 6,323,268 | B1 | 11/2001 | Fisher et al. |
| 6,398,865 | B1 | 6/2002 | Morita et al. |
| 2012/0096796 | A1 | 4/2012 | Sieto |

FOREIGN PATENT DOCUMENTS

| | | |
|---|---|---|
| EP | 1086935 A2 | 3/2001 |
| EP | 1294817 B1 | 6/2006 |
| JP | H04306274 A | 10/1992 |
| JP | 2004502017 A | 1/2004 |
| WO | WO0200799 A1 | 1/2002 |
| WO | WO2009133013 A1 | 5/2009 |

OTHER PUBLICATIONS

PCT/IN2015/000370 International Search Report dated Mar. 14, 2016, 4 pages.
English language abstract and machine translation for JPH04-306274 (A) extracted from https://www.j-platpat.inpit.go.ip database on Feb. 12, 2018, 7 pages.

*Primary Examiner* — Frances Tischler
(74) *Attorney, Agent, or Firm* — Warner Norcross & Judd LLP

(57) ABSTRACT

The present invention relates to a silicone composition, a substrate, such as cement, coated with the silicone composition, together with a process for providing a cross-linked silicone coated substrate, the silicone composition comprising at least: (A) an organopolysiloxane comprising an organocyclosiloxane; (B) an organosilane comprising at least two cross-blinking groups, X; and (C) an organosilicone resin comprising at least two cross-linking groups, X; wherein at least one of the organosilane (B) and the organosilicone resin (C) comprises at least three cross-linking groups.

18 Claims, No Drawings

SILICONE COMPOSITION, SUBSTRATE COATED WITH THE SILICONE COMPOSITION AND A PROCESS THEREFOR

FIELD OF THE INVENTION

The present invention relates to a silicone composition, and in particular a silicone composition for coating a substrate. A substrate, such as cement, coated with the silicone composition, together with a process for providing a cross-linked silicone coated substrate is also provided. The silicone composition can be used to impart moisture resistance to a substrate, and improve one or both of the bulk density and flow properties of a powder substrate.

BACKGROUND

Many materials, such as cement, are prone to attack by moisture. Cement is a ubiquitous construction material used in concrete and mortar which functions as an inorganic binder which hardens in the presence of water as a result of hydration. World cement consumption was approximately 3.6 billion metric tons in 2011. It is estimated that more than 10% of this cement is wasted or resulted in a construction material with a strength below its expected level as a result of the action of moisture on the cement prior to use.

Thus, there is a need to provide a coating for a substrate, such as cement, which provides improved properties to the substrate, particularly in terms of an increased shelf life due to resistance to attack by moisture prior to use, improved bulk density and/or improved flow properties.

SUMMARY OF THE INVENTION

In a first aspect, the present invention provides a silicone composition, comprising at least:
(A) an organopolysiloxane comprising an organocyclosiloxane;
(B) an organosilane comprising at least two cross-linking groups, X; and
(C) an organosilicone resin comprising at least two cross-linking groups, X;
wherein at least one of the organosilane (B) and the organosilicone resin
(C) comprises at least three cross-linking groups.

The silicone composition may be a silicone coating composition for use in the coating of a substrate, such as concrete.

In one embodiment, the silicone composition comprises at least:
(A) an organopolysiloxane comprising an organocyclosiloxane, said organopolysiloxane in the range of from 10 weight % to 80 weight % by total weight of components (A), (B) and (C);
(B) an organosilane comprising at least two cross-linking groups, X, said organosilane in the range of from 10 weight % to 80 weight % by total weight of components (A), (B) and (C); and
(C) an organosilicone resin comprising at least two cross-linking groups, X, said organosilicone in the range of from 10 weight % to 80 weight % by total weight of components (A), (B) and (C).
For the avoidance of doubt, the total weight of components (A), (B) and (C) amounts to 100 weight % for the purpose of the determination of the proportions of these three components. The silicone composition may further comprise other components as discussed below which are not considered when calculating the proportions of components (A), (B) and (C).

In another embodiment, the cross-linking groups, X, are independently selected from one or more of the group comprising hydrogen directly bonded to silicon, hydroxyl, acrylate, acyl, acyloxy, ketoxime, alkenyl, alkoxy, epoxy, amine, mercapto and methacrylate.

In yet another embodiment, the organopolysiloxane (A) may comprise an organocyclosiloxane having from 3 to 10 silicon atoms in the organocyclosiloxane ring. The cyclosiloxane ring of the organocyclosiloxane is substituted with the same or different substituted or unsubstituted organic radicals. Examples of suitable organic radicals are provided in the definition of this term provided below. Preferably, the organocyclosiloxane may be of general formula (6):

(6)

wherein $R^{13}$ and $R^{14}$ are independently a substituted or unsubstituted organic radical and f is an integer in the range of from 3 to 10, preferably from 4 to 6. For the avoidance of doubt, the two unallocated bonds extending from the each end of the organopolysiloxane shown in general formula (6) are intended to represent the same bond such that a cyclic structure is provided. The organocyclosiloxane is more preferably one or both of octa-$C_{1-6}$alkyl cyclotetrasiloxane and deca-$C_{1-6}$alkyl cyclopentasiloxane, still more preferably one or both of octamethyl cyclotetrasiloxane and decamethyl cyclopentasiloxane.

In a further embodiment, the organopolysiloxane (A) may be a mixture of organopolysiloxanes. In a still further embodiment, the organopolysiloxane (A) may further comprise a linear organopolysiloxane comprising at least two cross-linking groups, X as already defined.

In another embodiment, the linear organopolysiloxane which may constitute part of organopolysiloxane (A) may be a linear organopolysiloxane of general formula (5):

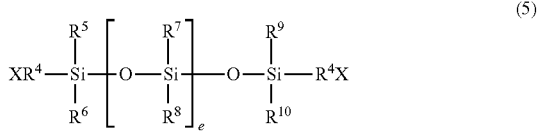

(5)

wherein X is a cross-linking group as already defined, $R^4$ is a covalent bond, or a divalent organic linking group, each $R^5$ to $R^{10}$ are independently a substituted or unsubstituted organic radical or the group $R^4X$, and e is an integer in the range of from 1 to 70. In one embodiment, the organopolysiloxane of general formula (5) comprises two $R^4X$ groups. In another embodiment, the organopolysiloxane of general formula (5) comprises at least three $R^4X$ groups. In this way, a three dimensional silicone may be formed upon cross-linking the silicone composition.

In another embodiment, the organopolysiloxane (A) may further comprise a linear organopolysiloxane having a viscosity of less than 100 mPa·s at 25° C. As used herein, the viscosity may be determined at 25° C. using a recording Brookfield viscometer with a Spindle 3 at 2 rpm according to ASTM D4287-00 (2010) unless otherwise indicated. This linear organopolysiloxane may comprise two or more cross-linking groups X as already discussed, or be free of such cross-linking groups. In one embodiment, this linear organopolysiloxane may be polydimethylsiloxane.

In another embodiment, the organosilane (B) may be of general formula (1):

$$R_{(4-a)}Si(R^1X)_a \quad (1)$$

wherein X is a cross-linking group as already defined, $R^1$ is a covalent bond or a divalent organic linking group which does not contain an aryl group, R is a substituted or unsubstituted organic radical, and a is 2, 3 or 4, preferably 3 or 4.

In yet another embodiment, the organosilane (B) of formula (1) may be an organosilane (B) of general formula (1) in which R is an alkyl group having from one to ten carbon atoms, preferably from 1 to 5 carbon atoms, $R^1$ is a covalent bond and X is one or both of an alkoxy group having from one to ten, preferably from one to five, carbon atoms and a ketoxime radical of general formula (11):

$$—O—N=CR^{11}R^{12} \quad (11)$$

in which $R^{11}$ and $R^{12}$ are independently an alkyl group having from one to ten carbon atoms. Still more preferably, a is 3 or 4.

In another embodiment, the organosilane (B) is a ketoxime in which at least one of the cross-linking groups X is a ketoxime of general formula (11) and R, $R^1$, $R^{11}$, $R^{12}$ and a are as defined in the previous paragraph. In such an embodiment, if not all the cross-linking groups X are ketoxime radicals of general formula (11), then the remaining cross-linking groups X are independently alkoxy groups having from one to ten, preferably from one to five, carbon atoms.

In a further embodiment, the organosilicone resin (C) may be a silsesquioxane resin based compound comprising at least two, preferably three or more cross-linking groups X as already defined. The silsesquioxane resin based compound may comprise at least one structural unit of general formula (2):

$$(R^3SiO_{(3-b)/2}(R^2X)_b) \quad (2)$$

and at least 80 mol. % of a structural unit of general formula (8):

$$R^{19}SiO_{3/2} \quad (8)$$

wherein each $R^3$ is independently selected from the group comprising an alkyl group having 1 to 10 carbon atoms and an alkenyl group having from 2 to 10 carbon atoms; $R^{19}$ is independently selected from the group comprising an alkyl group having 1 to 10 carbon atoms, an alkenyl group having from 2 to 10 carbon atoms, an aryl group having from 6 to 10 carbon atoms and an alkylaryl group having from one to five carbon atoms in the alkyl moiety and from four to ten atoms in the aryl ring(s) structure; $R^2$ is a covalent bond or a divalent organic linking group which does not contain an aryl group; X is a cross-linking group as defined above and b is independently 0, 1 or 2, with the proviso that the silsesquioxane resin based compound comprises at least two cross-linking groups X.

Preferably, $R^3$ and $R^{19}$ are independently selected from the group comprising an alkyl group having 1 to 10 carbon atoms and an alkenyl group having from 2 to 10 carbon atoms.

In one embodiment, the at least one structural unit of general formula (2) may be present in a non-zero amount of less than 20 mol. %, such as in a range of 1 to less than 20 mol. % of the silsesquioxane resin based compound. In such an embodiment, the structural unit of general formula (8) may be present in the silsesquioxane based compound in an amount of at least 80 mol. % to 99 mol. %.

In another embodiment, the at least one structural unit of general formula (2) makes up the balance, in terms of mol. %, of the silsesquioxane based compound, compared to that at least 80 mol. % of the structural unit of general formula (8).

Preferably, the silsesquioxane resin based compound comprises at least 3 cross-linking groups X. Still more preferably, the silsesquioxane resin based compound has, on average, 3 cross-linking groups per molecule. In a preferred embodiment, $R^3$ is an alkyl group having from 1 to 5 carbon atoms, such as a methyl group.

In a second aspect, there is provided a cross-linked silicone obtainable by cross-linking a silicone composition according to the first aspect. The cross-linking step may comprise curing the silicone composition, such as reacting the silicone composition with water, optionally in the presence of an acid or alkali.

In a third aspect, there is provided a substrate coated with the silicone composition of the first aspect, or the cross-linked silicone of the second aspect.

In one embodiment, the silicone composition of the first aspect has been cross-linked on the substrate to provide a cross-linked silicone.

In another embodiment, the substrate is cement, such as cement powder.

In a fourth aspect, there is provided a construction material comprising the substrate of the third aspect in which the substrate is cement.

In one embodiment, the construction material may further comprise one or more of aggregate, plasticizers, accelerators and air entraining agents.

In a fifth aspect, there is provided a process for providing a cross-linked silicone coated substrate comprising at least the steps of:
  providing a substrate;
  applying a silicone composition according to the first aspect to the substrate to provide a substrate coated with the silicone composition;
  cross-linking the silicone composition on the substrate to provide a cross-linked silicone coated substrate.

In one embodiment, the cross-linking step may comprise:
  contacting the silicone composition on the substrate with water, optionally in the presence of acid or alkali.

In another embodiment the substrate may comprise cement, such as cement powder.

In a sixth aspect, there is provided a process for providing a cross-linked silicone coated substrate comprising at least the steps of:
  providing a substrate;
  mixing the substrate with a cross-linked silicone of the second aspect to provide a cross-linked silicone coated substrate.

In one embodiment, the cross-linked silicone is a cross-linked silicone powder.

In another embodiment, the substrate may comprise cement, such as cement powder.

In yet another embodiment, the step of mixing the substrate with a cross-linked silicone may comprise grinding the substrate with the cross-linked silicone.

In a seventh aspect, there is provided the use of a silicone composition according to the first aspect or a cross-linked silicone according to the second aspect as one or more of the group comprising a hydrophobizing additive, a bulk density improver and a flow improver.

In one embodiment, the silicone composition or cross-linked silicone is used as one or more of a hydrophobizing additive for cement, a bulk density improver for cement and a flow improver for cement.

DETAILED DESCRIPTION OF THE INVENTION

The silicone composition disclosed herein may be used to form a coating on a substrate, such as cement. The coating on the substrate comprises a cross-linked silicone. The cross-linked silicone may be a cross-linked organopolysiloxane. The cross-linked silicone is prepared by cross-linking a silicone composition or is a silicone obtained by cross-linking the silicone composition.

The silicone composition comprises at least three components, (A) an organopolysiloxane comprising an organocyclosiloxane and optionally a linear organopolysiloxane, said linear organopolysiloxane comprising at least two cross-linking groups, (B) an organosilane comprising at least two cross-linking groups and (C) an organosilicone resin comprising at least two cross-linking groups. At least one of the organosilane (B) and the organosilicone resin (C) has at least three cross-linking groups. Preferably, both of the organosilane (B) and the organosilicone resin (C) comprise at least one organosilane and at least one organosilicone resin having at least three cross-linking groups.

As used herein, components (A), (B) and (C) of the silicone composition will be referred to generally as "silicon-containing compounds". Utilising a silicon-containing compound having at least three cross-linking groups provides a composition which can form an extensively cross-linked, providing a three dimensional coating on a substrate upon cross-linking.

The coating can impart hydrophobic properties to the substrate, providing protection from moisture and humidity.

The coating comprising a cross-linked silicone composition can form the external surface of the substrate. When this coating forms the outer surface of the substrate, it imparts improved handling properties. For instance, the coating can improve the bulk density and the flow properties of a powdered substrate.

The coating on the substrate can be prepared by cross-linking the silicone composition on the substrate. At least one cross-linking group may be present on each of the compounds taking part in the cross-linking reaction. As used herein, the term "cross-linking group" means a reactive group capable of taking part in a cross-linking reaction. Thus, a linear organopolysiloxane may be present having at least one cross-linking group. Similarly, an organosilane may be present having at least one cross-linking group. Similarly, an organosilicone resin may be present having at least one cross-linking group.

In order for the silicon-containing compounds to form chains during the cross-linking reaction, at least two cross-linking groups can be present on the compound. Thus, the linear organopolysiloxane optional component of organopolysiloxane (A), the organosilane (B) and the organosilicone resin (C) of the composition should each comprise at least two cross-linking groups such that they can cross-link to form chains.

It is pointed out that the organocyclosiloxane which is present in organopolysiloxane (A) does not comprise a cross-linking group, but is still capable of cross-linking to form chains due to the reactivity of the cyclic ring, which may be cleaved to take part in a cross-linking reaction.

However, at least one of the silicon-containing compounds in the silicone composition should have at least three cross-linking groups in order to provide a highly cross-linked three dimensional coating.

Preferably the cross-linking groups are also capable of forming bonds with the substrate.

The cross-linking group may be independently selected from one or more of hydrogen directly bonded to silicon, hydroxyl, acrylate, acyl, acyloxy, ketoxime, alkenyl, alkoxy, epoxy, amine, mercapto and methacrylate. The hydroxyl, acrylate, acyl, ketoxime, alkenyl, alkoxy, epoxy, amine, mercapto and methacrylate groups may be directly bonded to silicon.

The cross-linking groups should be capable of cross-linking via a cross-linking reaction. The cross-linking reaction producing the cross-linked silicone of the coating may be a condensation reaction, a hydrosilylation reaction, or a substitution reaction. For instance, hydrolysable cross-linking groups such as hydrogen directly bonded to silicon, acyl, acyloxy, ketoxime and alkoxy groups may be converted to hydroxyl groups which may then undergo condensation reactions. The cross-linking may be carried out in the presence of water, optionally in the presence of alkali or acid. The rate of cross-linking is typically higher in an alkaline environment than in an acidic environment. The rate of cross-linking in the presence of water alone proceeds more slowly than the rate in aqueous alkaline or acidic environments. Alkaline substrates such as cement can provide a good rate of cross-linking without requiring the presence of additional alkali. When the cross-linking groups comprise hydrogen directly bonded to silicon and a carbon-carbon double bond, such as an alkenyl, acrylate or methacrylate, the cross-linking may be by hydrosilylation. A hydrosilylation catalyst, such as a platinum containing compound may be present in the silicone composition to facilitate hydrosilylation. When the cross-linking groups comprise an amine and an epoxy group, the cross-linking may be by nucleophilic substitution.

Preferred cross-linking groups include hydrogen directly bonded to silicon, hydroxyl, $C_{1-6}$ alkoxy, $C_{1-6}$ acyl, ketoximes and $C_{1-6}$ acyloxy groups, such as $C_{1-5}$ alkyl-C(O)—O— groups. It is preferred that such cross-linking groups are directly bonded to silicon.

Alternatively, a divalent organic linking group $R^1$, $R^2$, $R^4$, $R^{18}$ may be present to link the cross-linking group to the optional linear organopolysiloxane of component (A), organosilane (B) or organosilicone resin (C). The divalent organic group may be independently selected from alkylene having from one to five carbon atoms, a divalent aryl group having from four to ten carbon atoms in the ring(s) structure and a divalent alkylaryl group having from one to five carbon atoms in the alkyl moiety and from four to ten atoms in the aryl ring(s) structure. The aryl group may comprise from one to three heteroatoms in the aryl ring(s) structure. The heteroatoms may be selected from O, N and S. The alkylene, divalent aryl group and divalent alkylaryl group each may be independently substituted or unsubstituted. If substituted, one or more hydrogen atoms present may be replaced with a cross-linking group as defined above, such that more than one cross-linking group is directly bonded to the divalent organic group. For instance, the divalent organic group and cross-linking groups together may be a melamine radical. Alternatively, one or more hydrogen atoms present may be independently replaced with a halogen atom, such as a fluorine or chlorine atom. Preferably, the divalent organic linking group is an alkylene group having from one to five carbon atoms, such as a group of formula —C$_n$H$_{2n}$—, in which n is an integer from 1 to 5.

At least three cross-linking groups are present on at least one of the silicon-containing compounds forming the silicone composition. In this way, a structured, three dimensional coating comprising cross-linked silicone is provided. In contrast, should less than three cross-linking groups be present on a silicon-containing compound, such compounds could only form part of a molecular chain, and not three dimensional networks, upon crosslinking.

As used herein in all embodiments unless stated otherwise, the term 'organic radical' is a radical group comprising carbon and hydrogen. The organic radical may be independently selected from the group comprising an alkyl having from one to ten, more preferably from one to five, carbon atoms, an alkenyl group having from two to ten, more preferably from two to five, carbon atoms, an aryl group having from four to ten carbon atoms in the ring(s) structure and an alkylaryl group having from one to five carbon atoms in the alkyl moiety and from four to ten atoms in the aryl ring(s) structure. The aryl group may comprise from one to three heteroatoms in the aryl ring(s) structure. The heteroatoms may be selected from O, N and S. Typically the aryl or alkylaryl group is Ph(CH$_2$)$_r$— in which Ph is a phenyl group and r is 0, 1, 2, 3 or 4.

The organic radical may be substituted or unsubstituted. Thus, the alkyl, alkenyl, aryl and alkylaryl groups forming R each may be independently substituted or unsubstituted. If substituted, one or more hydrogen atoms may each be replaced by a halogen atom such as a fluoro or chloro substituent or by an amine group, which may itself be substituted. For instance, the amine group may be a group of formula —NH—R$^{15}$—NH$_2$ in which R$^{15}$ is a divalent linking group, such as an alkylene group having from one to ten, preferably from one to five carbon atoms. For instance, the group R may be a group of formula —R$^{16}$—NH—R$^{15}$—NH$_2$ in which R$^{15}$ and R$^{16}$ are independently alkylene groups having from one to ten, more preferably from one to five carbon atoms.

Preferably the organic radical is a substituted or unsubstituted alkyl or substituted or unsubstituted alkenyl group as defined above. An organosilane (B) is present in the silicone composition which can be used to form the cross-linked silicone coating. A single type of organosilane compound may be used alone or a mixture of organosilanes may be used. When used in combination with other silicon-containing compounds which do not have at least three cross-linking groups, the organosilane should contain at least three cross-linking groups. Furthermore, other compounds, such as silicone polyethers may also be present during cross-linking.

The organosilane (B) may be a compound of general formula (1):

wherein each X is independently a cross-linking group as already defined, R$^1$ is a covalent bond or a divalent organic linking group discussed above, R is a substituted or unsubstituted organic radical as discussed above; and a is 2, 3 or 4. If none of the other silicon-containing compounds comprise at least 3 cross-linking groups, a is 3 or 4.

Typically, R$^1$ is a covalent bond, the cross-linking group X is hydroxyl or a hydrolysable group such as hydrogen directly bonded to silicon, acyl, acyloxy, ketoxime or alkoxy and the group R is substituted or unsubstituted alkyl having from one to ten carbon atoms. If the group R is a substituted alkyl group, it is preferably a group of formula —R$^{16}$—NH—R$^5$—NH$_2$ in which R$^{15}$ and R$^{16}$ are independently alkylene groups having from one to ten, more preferably from one to five carbon atoms. Preferred alkyl groups for the group R are methyl, ethyl and ethylenediaminepropyl. Preferred acyl and acyloxy groups of the cross-linking group X are those having from one to five carbon atoms, including the carbonyl group. Preferred alkoxy groups for the cross-linking group X are those having from one to five carbon atoms, with methoxy and ethoxy being most preferred. Preferred ketoxime groups for the cross-linking group X are those of general formula (11):

in which R$^{11}$ and R$^{12}$ are independently an alkyl group having from one to ten carbon atoms, more preferably an alkyl group having from one to five carbon atoms. In one embodiment, the organosilane (B) is one or more compounds selected from the group comprising methyl(ethylmethylketoxime) silane, (ethylenediaminepropyl) trimethoxy silane and methyltrimethoxy silane.

An organosilicone resin (C) is present in the silicone composition which can be used to form the cross-linked silicone coating. The organosilicone resin (C) may be a single organosilicone resin or a mixture of organosilicone resins. When used in combination with other silicon-containing compounds which do not have at least three cross-linking groups, the organosilicone resin should contain at least three cross-linking groups. Furthermore, other compounds, such as silicone polyethers may also be present during cross-linking. An organosilicone resin may be defined by one or more of the four possible monomer units M, D, T and Q. The organosilicone resin used herein may comprise one or more resins selected from the group MT, DT, MQ, MDT, MTQ and QDT.

In one embodiment, the organosilicone resin (C) may comprise from 0.2 to 10 percent by weight of cross-linking group X. Preferably, the organosilicone resin comprises from 1 to 5 percent by weight cross-linking group X, such as hydroxyl groups directly bonded to silicon. In another embodiment the organosilicone resin comprises a hydroxylated MDT silicone resin having 0.5 percent by weight hydroxyl groups and composed of 62 percent by weight CH$_3$SiO$_{3/2}$, 24 percent by weight (CH$_3$)$_2$SiO$_{2/2}$ and 14 percent by weight (CH$_3$)$_3$SiO$_{1/2}$.

It is preferred that the organosilicone resin (C) comprises a silsesquioxane resin based compound. The silsesquioxane resin based compound may comprise at least one structural unit of general formula (2):

and at least 80 mol. % of a structural unit of general formula (8):

wherein R$^3$ is independently selected from an alkyl having from one to ten, more preferably from one to five, carbon atoms and an alkenyl group having from two to ten, more preferably from two to five, carbon atoms, R$^{19}$ is independently selected from the group comprising an alkyl group having 1 to 10 carbon atoms, an alkenyl group having from 2 to 10 carbon atoms, an aryl group having from 6 to 10 carbon atoms and an alkylaryl group having from one to five carbon atoms in the alkyl moiety and from four to ten atoms in the aryl ring(s) structure, R$^2$ is a covalent bond or a divalent organic linking group as defined above and X is a cross-linking group as defined above and b is 0, 1 or 2 with the proviso that the silsesquioxane resin based compound comprises at least two cross-linking groups.

In one embodiment the silsesquioxane resin based compound preferably comprises at least three cross-linking groups X. For instance, the silsesquioxane resin based compound may comprise three structural units of general formula (2) in which b is 1. In another embodiment, the silsesquioxane resin based compound may comprise at least one structural unit of general formula (2) in which b is 1 and at least one structural unit of general formula (2) in which b is 2. In this way, the silsesquioxane resin based compound may form a three-dimensional structure upon cross-linking with the other components of the silicone composition.

Preferably the groups $R^3$ and $R^{19}$ are independently an alkyl or alkenyl group as already defined, the divalent organic group $R^2$ is a covalent bond or an alkylene group having from one to five carbon atoms and the silsesquioxane resin based compound comprises at least three cross-linking groups X. The groups $R^3$ and $R^{19}$ are preferably independently selected from an alkyl group having from 1 to 5 carbon atoms, more preferably a methyl group.

Without wishing to be bound by theory, the presence of alkyl or alkenyl substituents in the silsesquioxane resin based compound is believed to provide a more flexible coating after cross-linking of the silicone composition, leading to improved coating properties, such as decreased moisture absorption of a coated substrate, such as cement. Cement coated with such a silicone composition also provides mortar blocks and concrete with improved compressive strength, compared to uncoated cement.

In one embodiment, a silsesquioxane resin based compound may consist of at least 80 mol. % of the structural unit of general formula (8) defined above in which $R^{19}$ is independently selected from the group comprising an alkyl group having 1 to 10 carbon atoms and an alkenyl group having from 2 to 10 carbon atoms, with at least one structural unit of general formula (2) defined above making up the balance, in terms of mol. %. Thus, in such an embodiment, none of the structural units of the silsesquioxane resin based compound contain an aryl substituent, such as a phenyl group.

In a further embodiment, the silicone composition does not contain any aryl substituents i.e. none of the components comprising the silicone composition contain an aryl substituent. As used in this context, the term 'aryl substituent' is intended to mean a substituent comprising one or more aromatic rings.

In an alternative embodiment, the silsesquioxane resin based compound may comprise at least one structural unit of general formula (7):

 (7)

and at least 80 mol. % of a structural unit of general formula (8):

 (8)

wherein $R^{17}$ is independently selected from an aryl group having from four to ten carbon atoms in the ring(s) structure and an alkylaryl group having from one to five carbon atoms in the alkyl moiety and from four to ten atoms in the aryl ring(s) structure, $R^{18}$ is a covalent bond or a divalent organic linking group as defined above, $R^{20}$ is independently selected from the group comprising an alkyl group having 1 to 10 carbon atoms, an alkenyl group having from 2 to 10 carbon atoms, an aryl group having from 6 to 10 carbon atoms and an alkylaryl group having from one to five carbon atoms in the alkyl moiety and from four to ten atoms in the aryl ring(s) structure and X is a cross-linking group as defined above and b is 0, 1 or 2, with the proviso that the silsesquioxane resin based compound comprises at least two cross-linking groups. The aryl group may comprise from one to three heteroatoms in the aryl ring(s) structure. The heteroatoms may be selected from O, N and S. In one embodiment, the aryl or alkylaryl group $R^{17}$ may be $Ph(CH_2)_r$ in which Ph is a phenyl group; and r is 0, 1, 2, 3 or 4.

Preferably the groups $R^{17}$ and $R^{20}$ are independently selected from an aryl group having from 6 to 10 carbon atoms and an alkylaryl group having from one to five carbon atoms in the alkyl moiety and from four to ten atoms in the aryl ring(s) structure, the divalent organic group $R^2$ is a covalent bond or an alkylene group having from one to five carbon atoms and the silsesquioxane resin based compound comprises at least three cross-linking groups X. The groups $R^{17}$ and $R^{20}$ are more preferably independently selected from a phenyl or benzyl group, still more preferably a phenyl group.

Without wishing to be bound by theory, the presence of aryl substituents, such as phenyl, in the silsesquioxane resin based compound is thought to improve the toughness of the coating formed from the silicone composition.

The structural units (2) and (7) may be present in the same silsesquioxane resin based compound, or in different silsesquioxane resin based compounds constituting the organosilicone resin (C). For instance, in one embodiment, the organosilicone resin (C) comprises a silsesquioxane resin based compound comprising the structural units of general formulae (2), (7) and (9). In such an embodiment, the silsesquioxane resin based compound contains a combination of a) one or both of aryl and alkylaryl substituents as defined above and b) one or both of alkyl and alkenyl substituents are defined above. The combination of at least one structural unit of general formula (2) and at least one structural unit of general formula (7) may be present in the silsesquioxane resin based compound in a non-zero amount of less than 20 mol. %, for instance from 1 to less than 20 mol. %. In such an embodiment, the structural unit of general formula (8) may be present in the silsesquioxane based compound in an amount of at least 80 mol. % to 99 mol. %. In another embodiment, the combination of at least one structural unit of general formula (2) and at least one structural unit of general formula (7) may make up the balance of the silsesquioxane resin, in mol. % i.e. the balance compared to the at least 80 mol. % of the structural unit of general formula (8).

In another embodiment, the organosilicone resin (C) comprises at least two silsesquioxane resin based compounds including a first silsesquioxane resin based compound consisting of at least one structural unit of general formula (2) and at least 80 mol. % of a structural unit of general formula (9) and a second silsesquioxane resin based compound consisting of at least one structural unit of general formula (7) and at least 80 mol. % of a structural unit of general formula (9). The at least one structural unit of general formulae (2) or (7) may be present in the silsesquioxane resin based compound in a non-zero amount of less than 20 mol. %, for instance from 1 to less than 20 mol. %, with the structural unit of general formula (9) present in an amount of at least 80 mol. % to 99 mol. %.

The groups $R^3$, $R^{17}$ $R^{19}$ and $R^{20}$ may be substituted or unsubstituted. Thus, the alkyl, alkenyl, aryl and alkylaryl groups each may be independently substituted or unsubstituted. If substituted, one or more hydrogen atoms present may be replaced one or more hydrogen atoms may be replaced by halogen atom such as a fluoro or chloro substituent.

Typically, $R^2$ and if present $R^{18}$ are a covalent bond, the cross-linking group X is hydroxyl or a hydrolysable group such as hydrogen directly bonded to silicon, acyl, acyloxy, ketoxime or alkoxy and the group $R^3$ is alkyl having from one to five carbon atoms and if present $R^{17}$ is $Ph(CH_2)_r$— in which Ph is a phenyl group and r is 0, 1, 2, 3 or 4. Preferred acyl and acyloxy groups of the cross-linking group X are those having from one to five carbon atoms, including the carbonyl group. Preferred alkoxy groups of the cross-linking group X are those having from one to five carbon atoms, with methoxy and ethoxy being most preferred. Preferred $R^3$ groups are methyl and n-octyl. A preferred $R^{17}$ group is phenyl.

In one embodiment the silsesquioxane resin based compound comprises one of more of the group of ethoxy terminated n-octylsilsesquioxane resin, hydroxyl terminated n-octylsilsesquioxane resin, hydroxyl terminated methyl silsesquioxane resin, hydroxyl terminated methylphenyl silsesquioxane resin optionally in combination with one or both of hydroxyl terminated phenylsilsesquioxane resin and trimethyl siloxy terminated aminopropyl phenylsilsesquioxane resin.

An organopolysiloxane (A) is present in the silicone composition which can be used to form the cross-linked silicone coating. The organopolysiloxane (A) comprises an organocyclosiloxane optionally in combination with a linear organopolysiloxane. Furthermore, other compounds, such as silicone polyethers may also be present.

The organopolysiloxane (A) may comprise an organocyclosiloxane having from 3 to 10, preferably from 4 to 6, silicon atoms in the organocyclosiloxane ring. Preferably, the organopolysiloxane may be of general formula (6):

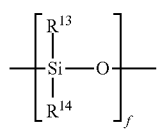

(6)

wherein $R^{13}$ and $R^{14}$ are independently a substituted or unsubstituted organic radical and f is an integer in the range of from 3 to 10, preferably from 4 to 6. The presence of the organocyclosiloxane in the organopolysiloxane (A) is advantageous because this can provide a consistent chain length of the cross-links. In contrast, linear organopolysiloxanes are commonly provided as a mixture of organopolysiloxanes having different chain lengths, which provides less uniformity of cross-links.

The groups $R^{13}$ and $R^{14}$ are preferably independently an alkyl having from one to ten, more preferably from one to five, carbon atoms and an alkenyl group having from two to ten, more preferably from two to five, carbon atoms. The groups $R^{13}$ and $R^{14}$ may be substituted or unsubstituted. If substituted, one or more hydrogen atoms may be replaced by halogen atom such as a fluoro or chloro substituent.

The organopolysiloxane (A) may further comprise a linear organopolysiloxane of general formula (5):

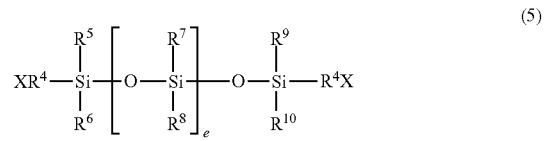

(5)

wherein X is a cross-linking group as already defined, $R^4$ is a covalent bond or a divalent organic linking group, each $R^5$ to $R^{10}$ are independently a substituted or unsubstituted organic radical or the group $R^4X$, and e is an integer in the range of from 1 to 70. When the organopolysiloxane of general formula (5) comprises at least three $R^4X$ groups, at least one of $R^5$ to $R^{10}$ is a group $R^4X$.

The groups $R^5$-$R^{10}$ are preferably independently an alkyl having from one to ten, more preferably from one to five, carbon atoms, an alkenyl group having from two to ten, more preferably from two to five, carbon atoms, an aryl group having from four to ten carbon atoms in the ring(s) structure and an alkylaryl group having from one to five carbon atoms in the alkyl moiety and from four to ten atoms in the aryl ring(s) structure. The aryl group may comprise from one to three heteroatoms in the aryl ring(s) structure. The heteroatoms may be selected from O, N and S.

The groups $R^5$-$R^{10}$ may be substituted or unsubstituted. Thus, the alkyl, alkenyl, aryl and alkylaryl groups forming $R^5$-$R^{10}$ each may be independently substituted or unsubstituted. If substituted, one or more hydrogen atoms may be replaced by halogen atom such as a fluoro or chloro substituent.

Typically, the $R^4$ is a covalent bond, the cross-linking group X is hydroxyl or a hydrolysable group such as hydrogen directly bonded to silicon, acyl, acyloxy, ketoxime or alkoxy and the groups $R^5$-$R^{10}$ are alkyl having from one to ten carbon atoms, preferably from one to five carbon atoms. Preferred acyl and acyloxy groups of the cross-linking group X are those having from one to five carbon atoms, including the carbonyl group. Preferred alkoxy groups for the cross-linking group X are those having from one to five carbon atoms, with methoxy and ethoxy being most preferred. Preferred alkyl groups for the groups $R^5$-$R^{10}$ are methyl and ethyl.

The linear organopolysiloxane may have a viscosity of less than 100 mPa·s at 25° C.

Further silicon-containing compounds may also be present in the silicone composition. For instance, one or both of an organosilane and organosilicone resin having one cross-linking group may be present. The organosilane and organosilicone may be as previously described, with the distinction that only one or two cross-linking groups are present on each compound. For instance an organosilane of general formula (1) in which a is 1 and/or an organosilicone resin comprising at least one structural unit of general formula (2) having only one cross-linking groups X in the resin may be present. Such silicon-containing compounds are disclosed as general formulae (3) and (4) below.

Thus, the silicone composition may further comprise an organosilane of general formula (3):

(3)

wherein X is a cross-linking group as already defined, $R^1$ is a covalent bond or a divalent organic linking group, R is a substituted or unsubstituted organic radical, and c is 1. Preferred definitions of the groups X, $R^1$ and R are the same as those for the organosilane of general formula (1) above.

The silicone composition may further comprise a silsesquioxane resin based compound comprising at least one structural unit of formula (4):

(4)

and at least 80 mol. % of a structural unit of general formula (8):

(8)

wherein $R^3$ and $R^{19}$ are independently a substituted or unsubstituted organic radical, $R^2$ is a covalent bond or a divalent organic linking group, X is a cross-linking group as defined above and d is 0 or 1 with the proviso that the silsesquioxane resin based compound comprises 1 cross-linking group X. Preferred definitions of the groups X, $R^2$, $R^3$ and $R^{19}$ are the same as those for the organosilane of general formula (2) above.

The at least one structural unit of general formula (4) may be present in the silsesquioxane resin based compound in a non-zero amount of less than 20 mol. %, for instance from 1 to less than 20 mol. %, with the structural unit of general formula (9) present in an amount of at least 80 mol. % to 99 mol. %.

The silicone composition comprises the silicon-containing compounds discussed above. The silicone composition may further comprise additional compounds. The additional compounds may or may not take part in the cross-linking reaction. Examples of such additional compounds include independently compatibility agents, such as an emulsifier, and a catalyst for the cross-linking reaction.

In a one embodiment, the silicone composition does not comprise any components containing aryl groups, such as phenyl groups.

The silicone composition may be a liquid. For instance, one or more of the silicon-containing compounds, such as the organopolysiloxane (A) may be a liquid. The liquid compound(s) may act as a solvent or a dispersant for the other silicon-containing compounds in the silicone composition.

The silicone composition may also be dissolved or dispersed in a liquid, such that it may be applied as a solution or a dispersion. The liquid may comprise an organic liquid. When the liquid is an organic liquid, the silicone composition is typically present as a solution in the liquid. Preferred organic liquids are alkanols such as methanol and ethanol, aromatic liquids such as toluene and xylene, alkanes such as hexanes, heptanes and octanes, cycloalkanes such as cyclopentane, cyclohexane, cyclobutane, cycloparaffins, liquid hydrocarbon mixtures such as petroleum ether and silicone oils such as dialkylpolysiloxane, particularly dimethylpolysiloxane. Compatibility agents such as emulsifiers may be present to stabilise the silicone composition in the liquid. Silicone polyethers are one class of suitable emulsifier.

The silicone composition, preferably in liquid form, may be coated on a substrate by any suitable method.

Once the silicone composition has been applied to the substrate, the silicone composition can be cross-linked to provide the cross-linked silicon coated substrate. The cross-linking reaction may be carried out at ambient temperature, or higher than ambient temperature, for instance in the range of form ambient temperature to 150° C., preferably in the range of from 40 to 150° C., more preferably at a temperature in the range of from 50 to 70° C. The cross-linking reaction may be a curing reaction.

Thus, there is also provided a process for providing a silicone coated substrate comprising at least the steps of:
providing a substrate;
applying a silicone composition as disclosed herein to the substrate to provide a substrate coated with the silicone composition;
cross-linking the silicone composition on the substrate to provide a cross-linked silicone coated substrate.

The substrate may be cement, such as cement powder. The rate of the cross-linking reaction is high when it is carried out in the presence of highly alkaline substrates such as cement. Consequently, it is preferred that the silicone composition is applied to a cement substrate with mixing, to ensure that the silicone composition coats the cement substrate during cross-linking.

The silicone composition may be applied to the substrate by mixing a silicone composition in liquid form with the substrate The mixture of substrate and, silicone composition may be agitated, for instance in a mixer.

Alternatively, the coating composition in the liquid can be applied to the substrate by spraying.

The cross-linking can be carried out as discussed above. Typically, the cross-linking step comprises:
contacting the silicone composition on the substrate coated with the silicone composition with water, optionally in the presence of acid or alkali.

Surprisingly, it has been found that even when the silicone composition is cross-linked to form a cross-linked silicone before it is applied to the substrate, the beneficial properties are still observed.

Thus, there is also provided a process for providing a cross-linked silicone coated substrate comprising at least the steps of:
providing a substrate;
mixing the substrate with a cross-linked silicone to provide a cross-linked silicone coated substrate.

The cross-linked silicone may be provided by the step of:
cross-linking a silicone composition as disclosed herein to provide the cross-linked silicone.

The cross-linked silicone may be a solid. Thus, the step of mixing the substrate with a cross-linked silicone may comprise grinding the substrate with the cross-linked silicone.

It is preferred that the cross-linked silicone comprises unreacted cross-linking groups. Such groups may improve the properties of the coating on the substrate. In particular, when the cross-linked silicone formed from the silicone composition is coated onto a substrate, such as cement, the cross-linked silicone exhibits improved bonding to the cement.

In this way, a substrate coated with cross-linked silicone may be provided.

The cross-linked silicone coating on the substrate may comprise at least 0.05 wt. % of the coated cement, and may alternatively be in the range of from 0.5 to 5 wt. %, alternatively from 0.5 to 2.0 wt. % of the coated cement.

There is further provided the use of a silicone composition or a cross-linked silicone as disclosed herein as one or more of the group comprising a hydrophobizing additive, a bulk density improver and a flow improver.

When the substrate is cement, the cross-linked silicone coated cement may be used in a construction material. Thus, a construction material comprising the cross-linked silicone coated cement is provided. The construction material may comprise one of more of aggregate, plasticizers, accelerators and air entraining agents.

As used herein, the term "cement" refers to an inorganic binder material which hardens in the presence of water as a result of hydration. Non-exhaustive examples of cements include Portland cement, phosphate cement, high alumina cements, high gypsum cements, gypsum-free cements and combinations thereof.

Aggregate is a particulate material which provides bulk to the concrete. It should be resistant to compressive stress and may have a variety of sizes. Examples of aggregates used in concrete include sand, gravel, crushed stone, slag and crushed concrete. Cement may be used as a binder for aggregates to form a concrete. When mixed with water, the cement hydrates to form crystal lattices which lock the aggregate into a rigid structure.

It will be apparent that when the aggregate comprises sand, the concrete composition provided may be used as a reinforced mortar composition.

Plasticizer such as sulphonated naphthalene, melamine-formaldehyde condensates, sulphonated melamine-formaldehyde condensates, modified ligno sulphonates and polymeric additives such as acrylate based latexes, disperse the solids in composition, particularly at low water/cement ratios, and may optionally be present in the concrete composition.

Accelerators such as calcium nitrate and sodium nitrate increase the rate of hydration of the cement and therefore the setting time of the concrete composition, and may optionally be present in the concrete composition.

Air entraining agents such as hydrolysed protein and keratin compounds, sodium isopropyl naphthalene sulphonate, petroleum naphthalene sulphate, sodium secondary alkyl sulphate, saponin, sodium alkyl aryl sulphate and stabilised saponified rosin and resin compounds, introduce air bubbles into the concreter composition prior to hardening in order to improve durability and may also be optionally present in the concrete composition.

A concrete composition may be prepared from the cross-linked silicone coated cement by a method comprising at least the steps of:
  mixing cross-linked silicone coated cement as disclosed herein and aggregate to provide a mixture;
  adding water to the mixture;
  setting the mixture.

The steps of mixing and adding may occur simultaneously.

The method may further comprise the step of adding plasticizer prior to the addition of the aggregates.

The method may further comprise the step of adding air entraining agents, typically with mixing, prior to the step of setting the mixture.

In another embodiment, a method of preparing a concrete composition may comprise:
  mixing cross-linked silicone coated cement as disclosed herein with water to provide a paste;
  adding aggregates to the paste to provide a mixture;
  adding further water to the mixture;
  setting the mixture.

Embodiments of the invention will be better understood by reference to the following examples which are presented by way of illustration and are not meant to be limiting.

EXAMPLES

The following experimental examples describe the preparation of a number of cross-linked silicone coatings on cement.

Moisture Absorption

The cross-linked silicone coated cement was tested for moisture absorption and compared with uncoated cement. 10 g each of the uncoated and coated cement samples were placed in aluminium cups of identical dimensions and exposed to an atmosphere of high humidity in a humidity chamber, set at humidity of more than 99% and a temperature of 30° C. The moisture absorption of the coated and uncoated cement was then determined by measuring the weight of an individual sample after 2 and 90 days and noting any solidification. The increase in weight indicates the amount of water absorbed by the cement sample.

Bulk Density

The bulk density of cross-linked silicone coated cement was tested using the tap method and compared to that of uncoated cement. A measuring cylinder with lid of 100 ml capacity was used in this measurement. The weight of the empty measuring cylinder with lid was recorded on an analytical balance to three digit accuracy. Then an accurately weighed 50 g sample of either the coated or uncoated cement was added to the measuring cylinder and then the cylinder was tapped for 100 times. The volume occupied by the coated or uncoated cement was then measured and recorded. The test was repeated 5 times for each sample and the reading, averaged.

Compressive Strength

The cross-linked silicone coated cement was tested for compressive strength and compared with uncoated cement. The coated and uncoated cements were used in the preparation of mortar specimens by mixing either the coated or uncoated cement with three types of sand in equal proportion by weight. The three types of sand used was Grade 1 Sand (particle size >2 mm and <1 mm), Grade 2 Sand (particle size >1 mm and <0.5 mm) and Grade 3 Sand (particle size >0.5 mm and <0.09 mm). The water to cement ratio was fixed at 0.47 by weight. The cement and sand were thoroughly mixed and then the exact amount of water was added to it while mixing. The mixture was then poured into a mild steel mold of dimensions 7 cm×7 cm×7 cm on a vibrating table. The vibrating table was kept activated for 2 minutes after filling the mixture into the mold in order to achieve uniform filling and air removal. The mold was then labelled and stored for setting. After 24 hrs the mortar specimen block was removed from mold and labelled and stored under water to gain strength. The compressive strength testing was done using standard Compressive Strength Machine (CSM) at 3 days, 7 days and 28 days maturation of mortar specimen block.

Materials

The following examples use a number of silsesquioxane resin based compounds. These silsesquioxane resin based compounds are prepared by the hydrolysis of organochlorosilanes or mixtures of chlorosilanes with water by conventional processes.

The hydroxyl terminated methylsilsesquioxane resin is a TD resin at 50 wt. % solids in toluene prepared by the hydrolysis of an approximately 9:1 mixture by weight of methyltrichlorosilane:dimethyldichlorosilane with water.

The hydroxyl terminated phenyl silsesquioxane resin is a phenyl silsesquioxane solid flake resin at 100 wt. % solids prepared from the hydrolysis of phenyl trichlorosilane with water.

The hydroxyl terminated methylphenylsilsesquioxane resin is prepared by the hydrolysis of a mixture of phenyltrichlorosilane, diphenyldichlorosilane, phenylmethyldichlorosilane and methyltrichlorosilane with water.

The ethyoxy and hydroxyl terminated n-octylsilsesquioxane resin is prepared by the hydrolysis of n-octyltriethoxysilane with water.

The trimethylsiloxy terminated aminopropyl phenyl silsesquioxane resin is prepared by the hydrolysis of phenyltriethoxysilane and γ-aminopropyltriethyoxysilane with water in the presence of hexamethyldisiloxane.

Example 1 (Composition—Resin)

40 g of hydroxyl terminated methylsilsesquioxane resin was taken in 500 ml beaker and 35 g of decamethyl cyclopentasiloxane fluid was added to it. The mixture was stirred until the resin is dissolved completely. To this mixture 10 g of methyltri(ethylmethylketoxime) silane, 1 g of (ethylenediaminepropyl) trimethoxysilane and 14 g of methyltrimethoxysilane were added and stirred well to make a homogeneous mixture.

5 g of the above mixture was added to 995 g of Ordinary Portland Cement (OPC) and mixed using a domestic mixture grinder (Bajaj Electric Co. power 760 W) for 1 min with the lid on. This gave the coated cement ready for use.

The coated cement was then tested for moisture absorption and compared with uncoated cement. It was observed that the moisture absorption by the coated cement was up to 0.01 wt. % with no curing of cement even after 90 days of exposure, while uncoated cement showed a moisture absorption up to 2.5 wt. % within 2 days at which time the surface become totally solid by cement curing.

The bulk density of coated and uncoated cement was tested using the tap method. It was observed that the bulk density of the coated cement was increased by 30% compared to that of the uncoated cement.

The treated cement was then tested for compressive strength and compared with uncoated cement. The compressive strength of the mortar blocks made from coated cement was found to be improved by 7% compared to that made from uncoated cement after 28 days maturation.

Example 2 (Composition—Alternative Resin)

40 g of hydroxyl terminated methylphenylsilsesquioxane resin was taken in 500 ml beaker and 35 g of decamethyl cyclopentasiloxane fluid was added to it. The mixture was stirred until the resin is dissolved completely. To this mixture 10 g of methyltri(ethylmethylketoxime) silane, 1 g of (ethylenediaminepropyl)trimethoxysilane and 14 g of methyltrimethoxysilane were added and stirred to make a homogeneous mixture.

5 g of the above mixture was added to 995 g of Ordinary Portland Cement (OPC) and mixed using a domestic mixture grinder (Bajaj Electric Co. power 760 W) for 1 min with the lid on. This gave the coated cement ready for use.

The coated cement was then tested for moisture absorption and compared with uncoated cement. It was observed that the moisture absorption by the coated cement was up to 0.02 wt. % with no curing of cement even after 90 days of exposure, while uncoated cement showed a moisture absorption of up to 2.5 wt. % within 2 days at which time the surface become totally solid by cement curing.

The bulk density of coated and uncoated cement was tested using the tap method. It was observed that the bulk density of coated cement was increased by 28% compared to that of uncoated cement.

The coated cement was then tested for compressive strength and compared with uncoated cement. The compressive strength of mortar blocks made from coated cement was found to be improved by 3% compared to that made from uncoated cement after 28 days maturation.

Example 3 (Composition—Mixture of Resins)

20 g of hydroxyl terminated methylsilsesquioxane resin and 20 g of hydroxyl terminated phenylsilsesquioxane resin was taken in a 500 ml beaker and 35 g of decamethyl cyclopentasiloxane fluid was added to it. The mixture was stirred until the resin is dissolved completely. To this mixture 10 g of methyltri(ethylmethylketoxime) silane, 1 g of (ethylenediaminepropyl) trimethoxysilane and 14 g of methyltrimethoxysilane were added and stirred well to make a homogeneous mixture.

5 g of the above mixture was added to 995 g of Ordinary Portland Cement (OPC) and mixed well using a domestic mixture grinder (Bajaj Electric Co. power 760 W) for 1 min with the lid on. This gave the coated cement ready for use.

The coated cement was then tested for moisture absorption and compared with uncoated cement. It was observed that the moisture absorption by the coated cement was up to 0.01 wt. % with no curing of cement even after 90 days of exposure, while uncoated cement showed a moisture absorption of up to 2.5 wt % within 2 days at which time the surface become totally solid by cement curing.

The bulk density of coated and uncoated cement was tested using the tap method. It was observed that the bulk density of coated cement was increased by 29% compared to that of the uncoated cement.

The coated cement was then tested for compressive strength and compared with uncoated cement. The compressive strength of mortar blocks made from the coated cement was found to be improved by 6% compared to that made from uncoated cement after 28 days maturation.

Example 4 (Composition—Alternative Cyclic Siloxane)

40 g of hydroxyl terminated methylsilsesquioxane resin was taken in a 500 ml beaker and 35 g of decamethyl cyclotetrasiloxane fluid was added to it. The mixture was stirred until the resin was dissolved completely. To this mixture then 10 g of methyltri(ethylmethylketoxime) silane, 1 g of (ethylenediaminepropyl) trimethoxysilane and 14 g of methyltrimethoxysilane were added and stirred well to make a homogeneous mixture.

5 g of the above mixture was added to 995 g of Ordinary Portland Cement (OPC) and mixed well using a domestic mixture grinder (Bajaj Electric Co. power 760 W) for 1 min with the lid on. This gave the coated cement ready for use.

The coated cement was then tested for moisture absorption and compared with uncoated cement. It was observed that the moisture absorption by coated cement was up to 0.01 wt. % with no curing of the cement even after 90 days of exposure, while uncoated cement showed a moisture absorption up to 2.5 wt. % within 2 days at which time the surface become totally solid by cement curing.

The bulk density of coated and uncoated cement was tested using the tap method. It was observed that the bulk density of coated cement was increased by 30% compared to that of uncoated cement.

The coated cement was then tested for compressive strength and compared with uncoated cement. The compressive strength of mortar blocks made from treated cement was found improved by 7% compared to that made from non treated cement after 28 days maturation.

Example 5 (Mixture of Silicone Resins and Mixture of Cyclic Fluids)

20 g of hydroxyl terminated methylsilsesquioxane resin and 20 g of hydroxyl terminated phenylsilsesquioxane resin were taken in a 500 ml beaker and 20 g of decamethyl cyclopentasiloxane fluid and 15 g of octamethyl cyclotetrasiloxane were added to it. The mixture was stirred until resin is dissolved completely. To this mixture 10 g of methyltri(ethylmethylketoxime) silane, 1 g of (ethylenediaminepropyl) trimethoxysilane and 14 g of methyltrimethoxysilane were added and stirred to make a homogeneous mixture.

5 g of above mixture was added to 995 g of Ordinary Portland Cement (OPC) and mixed using domestic mixture grinder (Bajaj Electric Co. power 760 W) for 1 min with the lid on. This gave the coated cement ready for use.

The coated cement was then tested for moisture absorption and compared with uncoated cement. It was observed that the moisture absorption by the coated cement was up to 0.03 wt. % with no curing of the coated cement even after 90 days of exposure, while the uncoated cement showed a moisture absorption up to 2.5 wt. % within 2 days at which time the surface become totally solid by cement curing. The bulk density of coated and uncoated cement was tested using the tap method. It was observed that the bulk density of coated cement was increased by 26% compared to that of the uncoated cement.

The coated cement was then tested for compressive strength and compared with uncoated cement. The compressive strength of mortar blocks made from the coated cement was found to be improved by 5% compared to that made from uncoated cement after 28 days maturation.

Example 6 (Mixture of Resins and Alternative Silanes)

20 g each of ethoxy and hydroxyl terminated n-octylsilsesquioxane resin and trimethyl siloxy terminated aminopropyl phenyl silsesquioxane resin were taken in a 500 ml beaker and 35 g of decamethyl cyclopentasiloxane fluid was added to it. The mixture was and stirred until the resin was dissolved completely. To this mixture 10 g of n-octyltriethoxy silane, 1 g of (ethylenediaminepropyl)trimethoxysilane and 14 g of methyltrimethoxysilane were added and stirred to make a homogeneous mixture.

5 g of the above mixture was added to 995 g of Ordinary Portland Cement (OPC) and mixed using a domestic mixture grinder (Bajaj Electric Co. power 760 W) for 1 min with the lid on. This gave the coated cement ready for use.

The coated cement was then tested for moisture absorption and compared with uncoated cement. It was observed that the moisture absorption by the coated cement was up to 0.04 wt. % with no curing of cement even after 90 days of exposure, while the uncoated cement showed a moisture absorption up to 2.5 wt. % within 2 days at which time the surface become totally solid by cement curing.

The bulk density of coated and uncoated cement was tested using tap method. It was observed that the bulk density of the coated cement was increased by 25% compared to that of the uncoated cement.

The coated cement was then tested for compressive strength and compared with uncoated cement. The compressive strength of mortar blocks made from the coated cement was found to be improved by 7% compared to that made from the uncoated cement after 28 days maturation.

Example 7 (Alternative Silanes and Increased Temperature)

40 g of hydroxyl terminated methylsilsesquioxane resin was taken in a 500 ml beaker and 35 g of decamethyl cyclopentasiloxane fluid was added to it. The mixture was stirred at 80° C. until resin is dissolved completely. To this mixture 10 g of aminoethylaminopropyl trimethoxysilane silane and 15 g of methyltrimethoxysilane was added and stirred at 80° C. to make a homogeneous mixture.

5 g of the above mixture was added to 995 g of Ordinary Portland Cement (OPC) and mixed using a domestic mixture grinder (Bajaj Electric Co. power 760 W) for 1 min with the lid on. This gave the coated cement ready for use.

The coated cement was tested for moisture absorption and compared with uncoated cement. It was observed that the moisture absorption by the coated cement was up to 0.01 wt. % with no curing of the cement even after 90 days of exposure, while uncoated cement showed a moisture absorption of up to 2.5 wt. % within 2 days at which time the surface become totally solid by cement curing.

The bulk density of coated and uncoated cement was tested using the tap method. It was observed that the bulk density of the coated cement was increased by 25% compared to that of the uncoated cement.

The coated cement was then tested for compressive strength and compared with uncoated cement. The compressive strength of mortar blocks made from the coated cement was found to be improved by 6% compared to that made from the uncoated cement after 28 days maturation.

Example 8 (Mixture of Resins, Mixture of Cyclics and Silanes at Higher Temperature)

20 g of hydroxyl terminated methylsilsesquioxane resin and 20 g of hydroxyl terminated phenylsilsesquioxane resin were taken in a 500 ml beaker and 20 g of decamethyl cyclopentasiloxane fluid and 15 g of octamethyl cyclotetrasiloxane were added to it. The mixture was stirred at 80° C. until the resin is dissolved completely. To this mixture 10 g of methyltri(ethylmethylketoxime) silane, 1 g of (ethylenediaminepropyl) trimethoxysilane and 14 g of methyltrimethoxysilane were added and stirred at 80° C. to make homogeneous mixture.

5 g of the above mixture was added to 995 g of Ordinary Portland Cement (OPC) and mixed using a domestic mixture grinder (Bajaj Electric Co. power 760 W) for 1 min with the lid on. This gave the coated cement ready for use.

The coated cement was tested for moisture absorption and compared with uncoated cement. It was observed that the moisture absorption by the coated cement was up to 0.03 wt. % with no curing of the coated cement even after 90 days of exposure, while the uncoated cement showed a moisture absorption of up to 2.5 wt. % within 2 days at which time the surface become totally solid by cement curing. The bulk density of coated and uncoated cement was tested using the tap method. It was observed that the bulk density of the coated cement was increased by 26% compared to that of the uncoated cement.

The coated cement was tested for compressive strength and compared with uncoated cement. The compressive strength of mortar blocks made from the coated cement was found to be improved by 5% compared to that made from the uncoated cement after 28 days maturation.

Example 9 (Mixture of Linear and Cyclic Organopolysiloxane)

40 g of hydroxyl terminated methylsilsesquioxane resin was taken in 500 ml beaker and 15 g of dimethyl siloxane hydroxyl terminated 72 cst and 20 g of decamethyl cyclopentasiloxane fluid was added to it. The mixture was stirred until the resin is dissolved completely. To this mixture 10 g of methyltri(ethylmethylketoxime) silane, 1 g of (ethylenediaminepropyl) trimethoxysilane and 14 g of methyltrimethoxysilane were added and stirred well to make a homogeneous mixture.

5 g of the above mixture was added to 995 g of Ordinary Portland Cement (OPC) and mixed using a domestic mixture grinder (Bajaj Electric Co. power 760 W) for 1 min with the lid on. This gave the coated cement ready for use.

The coated cement was then tested for moisture absorption and compared with uncoated cement. It was observed that the moisture absorption by the coated cement was up to 0.03 wt. % with no curing of cement even after 90 days of exposure, while uncoated cement showed a moisture absorption up to 2.5 wt. % within 2 days at which time the surface become totally solid by cement curing.

The bulk density of coated and uncoated cement was tested using the tap method. It was observed that the bulk density of the coated cement was increased by 25% compared to that of the uncoated cement.

The treated cement was then tested for compressive strength and compared with uncoated cement. The compressive strength of the mortar blocks made from coated cement was found to be improved by 4% compared to that made from uncoated cement after 28 days maturation.

Reference Example 1 (Linear Organopolysiloxane Only)

40 g of hydroxyl terminated methylsilsesquioxane resin was taken in 500 ml beaker and 35 g of dimethyl siloxane hydroxyl terminated 72 cst was added to it. The mixture was stirred until the resin is dissolved completely. To this mixture 10 g of methyltri(ethylmethylketoxime) silane, 1 g of (ethylenediaminepropyl) trimethoxysilane and 14 g of methyltrimethoxysilane were added and stirred well to make a homogeneous mixture.

5 g of the above mixture was added to 995 g of Ordinary Portland Cement (OPC) and mixed using a domestic mixture grinder (Bajaj Electric Co. power 760 W) for 1 min with the lid on. This gave the coated cement ready for use.

The coated cement was then tested for moisture absorption and compared with uncoated cement. It was observed that the moisture absorption by the coated cement was up to 0.03 wt. % with no curing of cement even after 90 days of exposure, while uncoated cement showed a moisture absorption up to 2.5 wt. % within 2 days at which time the surface become totally solid by cement curing.

The bulk density of coated and uncoated cement was tested using the tap method. It was observed that the bulk density of the coated cement was increased by 22% compared to that of the uncoated cement.

The treated cement was then tested for compressive strength and compared with uncoated cement. The compressive strength of the mortar blocks made from coated cement was found to be improved by 3% compared to that made from uncoated cement after 28 days maturation.

The present invention should not be considered limited to specific examples described herein, but rather should be understood to cover all aspects of the invention. Various modifications and equivalent processes, as well as numerous structures and devices, to which the present invention may be applicable, will be readily apparent to those skilled in the art. Those skilled in the art will understand that various changes may be made without departing from the scope of the invention, which is not to be considered limited to what is described in the specification.

The invention claimed is:

1. A silicone composition comprising:
   (A) an organopolysiloxane comprising;
      an organocyclosiloxane, and
      a linear organopolysiloxane comprising at least two cross-linking groups (X);
   (B) an organosilane comprising at least two cross-linking groups (X), the organosilane (B) having at least one group independently selected from ketoxime groups and a group of general formula $-R^{16}-NH-R^{15}-NH_2$ in which $R^{15}$ and $R^{16}$ are independently alkylene groups having from one to ten carbon atoms; and
   (C) an organosilicone resin comprising at least two cross-linking groups (X);
   wherein at least one of the organosilane (B) and the organosilicone resin (C) comprises at least three of the cross-linking groups (X); and
   wherein the organosilicone resin (C) is a silsesquioxane resin comprising at least one structural unit of general formula (2):

$$(R^3SiO_{(3-b)/2}(R^2X)_b) \quad (2)$$

and at least 80 mol. % of a structural unit of general formula (8):

$$R^{19}SiO_{3/2} \quad (8)$$

wherein each of $R^3$ and $R^{19}$ is independently selected from the group consisting of an alky group having one to ten carbon atoms and an alkenyl group having from two to ten carbon atoms, $R^2$ is a covalent bond or a divalent organic linking group which does not contain an aryl group, and subscript b is 0, 1 or 2, with the proviso that the silsesquioxane resin (C) comprises at least two of the cross-linking groups (X).

2. The silicone composition of claim 1, wherein the cross-linking groups (X) are independently selected from one or more of the group consisting of hydrogen directly bonded to silicon, hydroxyl, acrylate, acyl, acyloxy, ketoxime, alkenyl, alkoxy, epoxy, amine, mercapto, and methacrylate.

3. The silicone composition of claim 2, wherein the organosilane (B) comprises at least one compound of general formula (1):

$$R_{(4-a)}Si(R^1X)_a \quad (1)$$

wherein X is the cross-linking group (X), $R^1$ is a covalent bond or a divalent organic linking group, R is a substituted or unsubstituted organic radical, and subscript a is 2, 3 or 4, optionally wherein subscript a is 3 or 4, provided at least one X is a ketoxime and/or at least one R is of general formula $-R^{16}-NH-R^{15}-NH_2$ in which $R^{15}$ and $R^{16}$ are independently alkylene groups having from one to ten carbon atoms.

4. The silicone composition of claim 3, wherein R is an alkyl group having from one to ten carbon atoms, $R^1$ is a covalent bond, and at least one X is a ketoxime of general formula (11):

$$-P-N=CR^{11}R^{12} \quad (11)$$

in which $R^{11}$ and $R^{12}$ are independently an alkyl group having from one to ten carbon atoms.

5. The silicone composition of claim 2, wherein the silsesquioxane resin (C) comprises at least three of the cross-linking groups (X).

6. The silicone composition of claim 2, wherein the linear organopolysiloxane of the organopolysiloxane (A) is of general formula (5):

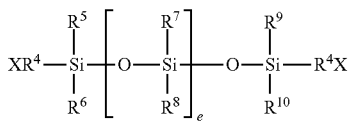

(5)

wherein X is the cross-linking group (X), $R^4$ is a covalent bond or a divalent organic linking group, each of $R^5$ to $R^{10}$ is independently a substituted or unsubstituted organic radical or the group $R^4X$, and subscript e is an integer in the range of from 1 to 70.

7. The silicone composition of claim 1, wherein the organocyclosiloxane of the organopolysiloxane (A) comprises an organocyclosiloxane having from three to ten silicon atoms in the organocyclosiloxane ring.

8. The silicone composition of claim 1, wherein the organocyclosiloxane of the organopolysiloxane (A) is of general formula (6):

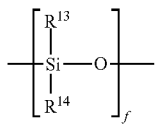

(6)

wherein each of $R^{13}$ and $R^{14}$ is independently a substituted or unsubstituted organic radical and subscript f is an integer in the range of from 3 to 10, optionally subscript f is an integer in the range of from 4 to 6.

9. A cross-linked silicone obtained by cross-linking the silicone composition according to claim 1.

10. A substrate coated with the silicone composition of claim 1, optionally wherein the silicone composition has been cross-linked on the substrate to provide a cross-linked silicone and/or optionally wherein the substrate is cement.

11. A construction material comprising the substrate of claim 10.

12. A process for providing a cross-linked silicone coated substrate comprising the steps of:
providing a substrate;
applying the silicone composition of claim 1 to the substrate to provide a substrate coated with the silicone composition; and
cross-linking the silicone composition on the substrate to provide the cross-linked silicone coated substrate;
optionally wherein the substrate is cement.

13. The process of claim 12, wherein the cross-linking step comprises:
contacting the silicone composition on the substrate with water, optionally in the presence of acid or alkali.

14. A process for providing a cross-linked silicone coated substrate comprising the steps of:
providing a substrate; and
mixing the substrate with the cross-linked silicone of claim 9 to provide the cross-linked silicone coated substrate;
optionally wherein the cross-linked silicone is a silicone powder; and/or
optionally wherein the mixing step comprises grinding the substrate with the cross-linked silicone.

15. A hydrophobizing additive, a bulk density improver, or a flow improver comprising the silicone composition of claim 1, optionally wherein the silicone composition is cross-linked such that it is a cross-linked silicone composition.

16. The silicone composition of claim 4, wherein the organosilane (B) comprises methyltri(ethylmethylketoxime) silane.

17. The silicone composition of claim 3, wherein at least one R is of general formula —$R^{16}$—NH—$R^{15}$—$NH_2$ in which $R^{15}$ and $R^{16}$ are independently alkylene groups having from one to ten carbon atoms, $R^1$ is a covalent bond, and X is one or both of an alkoxy group having from one to ten carbon atoms and a ketoxime of general formula:

—O—N=$CR^{11}R^{12}$ in which $R^{11}$ and $R^{12}$ are independently an alkyl group having from one to ten carbon atoms.

18. The silicone composition of claim 17, wherein the organosilane (B) comprises (ethylenediaminepropyl) trimethoxysilane.

* * * * *

UNITED STATES PATENT AND TRADEMARK OFFICE
CERTIFICATE OF CORRECTION

PATENT NO. : 10,358,389 B2
APPLICATION NO. : 15/513680
DATED : July 23, 2019
INVENTOR(S) : Deepak Vijay Dandekar et al.

Page 1 of 1

It is certified that error appears in the above-identified patent and that said Letters Patent is hereby corrected as shown below:

In the Claims

Column 22, Claim 4, Line 59:
"–P–N=CR$^{11}$R$^{12}$"

Should read:
-- –O–N=CR$^{11}$R$^{12}$ --

Signed and Sealed this
Tenth Day of September, 2019

Andrei Iancu
*Director of the United States Patent and Trademark Office*